3,265,618
LUBRICATING OIL COMPOSITIONS
Bennett M. Henderson, Edwardsville, and Richard L. Woodruff, Alton, Ill., assignors to Shell Oil Company, New York, N.Y., a corporation of Delaware
No Drawing. Filed July 26, 1963, Ser. No. 297,958
1 Claim. (252—32.5)

This invention relates to lubricating oil compositions which are highly detergent and also wear and sludge resistant.

It is known that non-ash forming nitrogen-containing polymers such as copolymers of long-chain alkyl acrylates and a polymerizable compound containing a basic amino group such as copolymers of long-chain alkyl methacrylates and amino alkylmethylacrylate possess good detergent properties. However, such lubricating oil compositions when subjected to wide temperature and pressure conditions, lack stability and wear resistant properties. Various means have been tried to overcome these deficiencies by modifying the polymer structure or by means of secondary additives, e.g. metal sulfonates, but these means have not been too successful.

It has now been discovered that certain non-ash forming heterocyclic nitrogen-containing detergent polymers can be rendered sludge and wear resistant and their stability greatly improved by addition to lubricating oils containing such non-ash forming heterocyclic nitrogen-containing detergent polymers, a small amount of an oil-soluble salt of an amino-imide of a long-chain mono substituted polymeric hydrocarbyl succinic anhydride and an acid aryl phosphate or its thio derivative and optionally an oil-soluble highly sulfurized hydrocarbon. By certain heterocyclic nitrogen containing detergent polymer is meant one selected from the group consisting of (A) copolymers of long-chain alkyl acrylates and vinyl pyridine and (B) copolymers of long-chain alkylate acrylates and vinyl pyrrolidone.

The polymers of group (A) having a molecular weight range of 50,000 to over 1,000,000, preferably between 200,000 and 800,000, can be prepared by methods described in British patent specification 760,544 and U.S. Patents 2,839,512 and 2,889,282 and include: copolymer of stearyl methacrylate and 2-methyl-5-vinyl pyridine; and those which contain additional $C_{1-4}$ alkyl methacrylates in the polymer, such as copolymers of stearyl methacrylate, lauryl methacrylate, methyl methacrylate and 2-methyl-5-vinyl pyridine; and similar copolymers in which the methyl methacrylate is replaced by butyl methacrylate and the 2-methyl-5-vinyl pyridine is replaced by 2-ethyl-5-vinyl pyridine; or the copolymers of group (B), namely N-vinyl pyrrolidone and alkyl acrylates which can be prepared by methods described in Belgian Patent 550,422 and British Patent 808,664. Vinyl pyrrolidone acrylate copolymers are sold by Rohm and Haas under the designations Acryloid 315X or 917 or 966 and are copolymers of N-vinyl pyrrolidone and lauryl methacrylate of varying molecular weights, preferably in the range 200,000 to 800,000 molecular weight.

Copolymers (A) have a molecular weight in excess of 50,000 and over 1,000,000 and a nitrogen content of from 0.2 to 3.5% which copolymers are exemplified by: (A) (I) lauryl methacrylate/stearyl methacrylate/2-methyl-5-vinyl pyridine, M.W. 600,000, N=0.54%; (A) (II) lauryl methacrylate/stearyl methacrylate/methyl methacrylate/2-methyl-5-vinyl pyridine, M.W. 50,000–700,000, (A) (III) lauryl methacrylate/styrene/2-methyl-5-vinyl pyridine. Copolymers (B) have a molecular weight ranging from 200,000 to 800,000 and have nitrogen-content of 0.2%–3%, (B) (I) octyl methacrylate/N-vinyl pyrrolidone, (B) (II) cetyl methacrylate/N-vinyl-3-methyl pyrrolidone, (B) (III) stearyl methacrylate/N-vinyl pyrrolidone, (B) (IV) lauryl methacrylate/N-vinyl pyrrolidone, (B) (V) lauryl methacrylate/C-vinyl-3,3-dimethyl pyrrolidone, (B) (VI) stearyl methacrylate/cetyl methacrylate/N-vinyl pyrrolidone, (B) (VII) stearyl methacrylate/lauryl methacrylate/N-vinyl-3-methyl pyrrolidone and mixtures thereof.

The additive which when used in combination with detergent polymers as described is an oil-soluble salt of an amino-imide of a long-chain mono substituted polymeric hydrocarbyl succinic anhydride and an acid aryl phosphate. In the cationic portion of the salt by long-chain polymeric hydrocarbyl is meant an olefinic polymer straight or branch chain and derived from olefins of from 2 to 8 carbon atoms such as ethylene, propylene, 1-butene, isobutene, 1-hexene, styrene, alpha-methyl-styrene and copolymers thereof, the polyolefin having from 30 to 500 carbon atoms and a molecular weight of 400 to 5000, preferably from 800 to 1500 as determined by the light scattering method.

The cationic portion of the salts of the present invention may be prepared by any known means. The polymeric olefin portion of the cation includes polyethylene, polypropylene, polybutene, polyisobutylene, copolymer of ethylene/propylene, copolymer of ethylene/isobutylene, copolymer of ethylene/alpha-methyl-styrene and the like. Monoalkylation of maleic anhydride with the above type olefinic polymers may also be made by conventional means known in the art, preferably in the absence of a catalyst and at temperatures ranging from about 300° F. to 600° F., preferably between 350° F. and 450° F. The mole ratio of the polyolefin to maleic anhydride may vary from 1:1 to 1:10, preferably from 1:1 to 1:5, respectively.

The polyamines which are also used to form the cationic portion of the aryl phosphate salts of the present invention include alkylene polyamines such as ethylene diamine, diethylene triamine, triethylene tetramine, 1-methyl ethylene diamine, 1-ethyl ethylene diamine, propylene diamine, butylene diamine, trimethyl trimethylene diamine, tetramethylene diamine, diaminopentane diamine, diaminohexane, hexamethylene diamine, heptamethylene diamine, diamino-octane, decamethylene diamine, and the higher homologues of up to 18 carbon atoms; phenylene diamine, the alkylated phenylene diamines having nuclear substituents such as methyl, ethyl, propyl, butyl, etc., naphthalene diamine, and the alkylated naphthalene diamine; N,N'-dimethyl ethylene diamine, N,N'-(diethyl)ethylene diamine, N,N'-(dipropyl)ethylene diamine, N,N'-(2-hydroxypropyl)ethylene diamine, N,N'-(diethyl)propylene diamine, N,N'-(dipropyl)propylene diamine, N,N'-(dimethyl)butylene diamine, N,N'-(diethyl)butylene diamine; penta-(1-methylpropylene)hexamine; tetrabutylene pentamine; hexa-(1,1-dimethylethylene)heptamine; di-(1-methylbutylene)triamine; pentaamylenehexamine; tri-(1,2,2-trimethylethylene)tetramine; di-(1-methylamylene)triamine; tetra-(1,3-dimethyl propylene)pentamine; penta-(1,5-dimethylamylene)hexamine; di-(1-methyl-4-ethylbutylene)triamine; penta-(1,2-dimethyl-1-isopropylethylene)hexamine; tetra-octylenepentamine and the like. The preferred polyamines are the ethylene amines such as ethylene diamine, diethylene triamine, triethylene tetramine, tetraethylene pentamine, N-dimethylaminopropylamine, N-dimethylaminobutylamine, N-diethylaminopropylamine, ethylpropylaminoamylamine.

In forming the cationic portion of the salt the mole ratio of the monopolyolefinic succinic anhydride and polyamine and the reaction temperature must be carefully controlled to obtain desired end product. The mole ratio of the polyamine to the olefinic substituted succinic anhydride can vary from 0.1:1 to 1:1 respectively. The reaction temperature may vary from 220° F. to 500° F., preferably 300° F. to 450° F.

The cationic portion of the salts of this invention are illustrated by the following examples.

*Example X*

A mixture of 1 mole of polybutene having a molecular weight of about 1000 and 1 mole of maleic anhydride was heated at 410° F. in a nitrogen atmosphere with agitation for a period of 24 hours. The reaction mixture was cooled to 150° F. and 700 cc. of hexane added; after which the mixture was filtered under vacuum. After vacuum distillation to remove the hexane from the filtrate, the product was maintained at 350° F. at an absolute pressure of 10 mm. Hg for one hour to remove traces of maleic anhydride. The crude polybutenyl succinic anhydride thus prepared had a saponification number of 79.

A mixture of 0.45 mol of tetraethylene pentamine and 0.45 mol of the polybutenyl succinic anhydride was blended with agitation at 125° F. in a nitrogen atmosphere. The temperature was increased to 400° F. during a period of one hour, after which the absolute pressure was reduced to about 200 mm. Hg during a period of 30 minutes to facilitate the removal of water. The reaction mixture was then allowed to reach room temperature at this reduced pressure. The reaction product contained 5.1% nitrogen (theory=5.4%). Infra-red analysis showed that the reaction product was an imide containing a polybutene side chain.

*Example $X_1$*

A mixture of 0.21 mole of dimethylaminopropylamine and 0.09 mol of the polybutenyl succinic anhydride of Example X hereinabove was blended with agitation in a nitrogen atmosphere, and the mixture was heated at 500° F. for a period of one hour, after which the absolute pressure was reduced to about 200 mm. Hg at this temperature during a period of 30 minutes to facilitate the removal of water and excess amine. The reaction mixture was then allowed to reach room temperature at this reduced pressure. The reaction product contained 1.7% nitrogen (theory=1.8%). The identity of the N-dimethylaminopropylalkenyl succinimide was established by means of infra-red spectroscopy.

Other examples of cation portions of additives used to form phosphate salts of the present invention include:

| Olefinic-Succinic Anhydride | Amine | Mole Ratio | Temp., °F. |
|---|---|---|---|
| ($X_2$) Polyisobutylene (M.W. 850)-succinic anhydride. | Diethylamine propylamine. | 1/1 | 420 |
| ($X_3$) Polyisobutylene (M.W. 850)-succinic anhydride. | Tetraethylene pentamine. | 1.5/1 | 400 |
| ($X_4$) Polyethylene/isobutylene (M.W. 100)-succinic anhydride. | Dimethylamine propylamine. | 1/1 | 450 |
| ($X_5$) Polyethylene/alpha-methyl-styrene (M.W. 800)-succinic anhydride. | Tetraethylene pentamine. | 1/1 | 450 |
| ($X_6$) Polyisobutylene (M.W. 1000)-succinic anhydride. | ----do---------- | 1/1 | 400 |

The anionic portion of the salt is an acid aryl phosphate represented by the formula:

where Ar is an aromatic group and $R_1$ is hydrogen or the same as Ar, the Ar group may be mono or polynuclear having $C_{1-18}$ alkyl radicals attached thereto.

The acid aryl phosphates (Y) which are preferred are represented by the formulas:

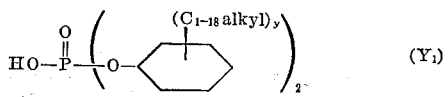

or

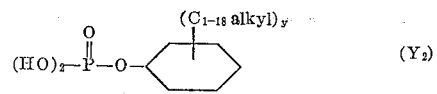

or mixtures of $Y_1$ and $Y_2$. The symbol y is an integer of 0 to 1.

The acid aryl phosphates presented by the above formulas include the mono acid aryl phosphates and diacid aryl phosphates and mixtures thereof. Thus, the compounds of this class may be specifically illustrated by phenyl or $C_{1-10}$ alkyl phenyl, e.g. methyl, ethyl, butyl, dimethyl, diisopropylphenyl monoacid and diacid phosphates of which preferred are phenyl, monocresyl and dicresyl acid phosphates and 50:50 mixtures thereof.

The salts used in accordance with this invention may be prepared by any of the conventional methods for preparing salts of organic nitrogen-containing bases and organic acid aryl phosphates. Thus, the amino-imide polymer may be dissolved in an organic solvent, such as benzene or xylene, and the acid phosphate added to the solution with agitation. The acid aryl phosphate itself may be dissolved in a suitable solvent. Alternatively, the polymeric compound may be suspended in a suitable liquid medium and the acid aryl phosphate stirred into the suspension. When using these methods, it may be necessary to isolate the salt by removing the solvent or suspending medium before the salt is added to the lubricating oil. Simpler methods, such as merely adding the acid to the melted polymeric compound are also suitable on occasion.

It is not essential that all the base be neutralized by acid aryl phosphate and in such cases the final product may be only from 10% to 50%, preferably from 20% to 40% neutralized.

The basic nitrogen-containing polymeric (amino-imide) salts of acid aryl phosphate used in oil compositions of the present invention are novel salts and form one feature of the present invention.

The following examples illustrate the preparation of the novel salts provided by the present invention. In these examples, the parts referred to are parts by weight.

*Example Z*

About 15 parts of the polymer of Example X were dissolved in 400 parts by volume of benzene and about 6 parts of dicresyl phosphate were added. The mixture was reacted under refluxed conditions until no more water separated. The benzene was distilled off under reduced pressure, the final traces being removed on a steam bath at 0.1 mm. Hg pressure. The residue was the dicresyl phosphate salt of the polymeric amino-imide compound of Example X.

*Example $Z_1$*

The procedure of Example Z was followed, but using a mixture comprising 4 parts of the polymer of Example $X_2$ which was dissolved in 1000 parts by volume of benzene, and 10 parts of dicresyl phosphate were added. The mixture was reacted under refluxed conditions until no more water separated. The benzene was distilled off under reduced pressure, the final traces being removed on a steam bath of 0.1 mm. Hg pressure. The residue was the dicresyl phosphate salt of the polymeric amino-imide of Example $X_2$.

*Example $Z_2$*

The procedure of Example Z was followed to prepare a polymeric amino-imide phosphate using 100 parts of the polymer of Example $X_1$ which was dissolved in 1000 parts by volume of benzene, and 10 parts of monocresyl phosphate. The mixture was refluxed until no more water separated. The benzene was distilled off under reduced pressure, the final traces being removed on a steam bath of 0.1 mm. Hg pressure. The residue was the monocresyl phosphate salt of the polymeric amino-imide of Example $X_1$.

Example $Z_3$

About 30 parts of the polymeric compound of Example $X_3$ was dissolved in 1000 parts by volume of benzene and to this solution was added about 2.7 parts of diphenyl phosphate having an acid value of 104 mg. KOH/g. (equivalent weight of about 560) which was dissolved in 125 parts by volume of benzene. The phosphate salt was prepared as in Example Z. The resulting homogeneous solution was filtered and the benzene distilled off. The residue was the diphenyl phosphate salt of the polymeric amino-imide of Example $X_3$.

Other examples of additives of the invention include:

($Z_4$) Oil-soluble salt of polymer of Example $X_4$, and methyl cresyl phosphate.

($Z_5$) Oil-soluble salt of polymer of Example $X_2$ and di-isopropylphenyl phosphate.

($Z_6$) Oil-soluble salt of polymer of Example $X_6$ and dicresyl phosphate.

($Z_7$) Oil-soluble salt of Example $X_3$ and monocresyl thiophosphate.

The optional additive which is at times particularly useful in combination with the additives described above is an oil-soluble highly sulfurized hydrocarbon product having a sulfur content of at least 20%, preferably about 30%, more preferred being in the range of 30 to 40% sulfur. The hydrocarbons include olefinic hydrocarbons such as polyolefins, e.g. polyisobutylene, long-chain olefins of $C_{12-30}$ carbon atoms obtained by dehalogenating chlorinated paraffin wax, terpene hydrocarbons and pine terpenes such as dipentene, terpinolene, cymene, carene, methene, terpene oil, and mixtures thereof. The sulfurization may be accomplished by any of the accepted methods of sulfurizing unsaturated hydrocarbons such as by the direct combination with sulfur at atmospheric or superatmospheric pressures or with sulfur under pressure of hydrogen sulfide or the like at a minimum reaction temperature of 100° C. and preferably between 150 and 350° C. A particularly suitable material is available under the trade name "Amoco 48" from Amoco Chemical Corporation and is a sulfurized terpene containing about 36% sulfur.

Each of the above additives can be used in lubricating oils in amounts ranging from about 0.1% to about 15% by weight, preferably from about 0.2% to about 10% by weight.

When desired, additional improvements with respect to oxidation stability and scuffing inhibition can be imparted to the oil compositions containing the polymer salts of this invention by incorporating small amounts (0.01%–2%, preferably 0.1%–1%) of phenolic antioxidants such as alkylphenols, e.g. 2,6-ditertbutyl-4-methylphenol or p,p'-methylene bisphenols such as 4,4'-methylene bis(2,6-ditertbutyl phenol) or arylamines such as phenyl-alpha-naphthylamine. Antiscuffing agents include organic phosphites, phosphates, phosphonates and their thio-derivatives, such as tri-($C_{3-18}$ alkyl phosphites), or phosphates, e.g. tributyl, octyl, lauryl, stearyl, cyclohexyl, benzyl, cresyl, phenyl phosphites or phosphates, as well as their thio-derivatives, $P_2S_5$-terpene reaction products, e.g. $P_2S_5$-pine oil reaction product and alkali metal salts thereof such as potassium salt of a $P_2S_5$-terpene reaction product, phosphates such as dibutyl trichloromethanephosphonate, dibutyl monochloromethanephosphonate and the like. The triphenyl, tricresyl, trilauryl and tristearyl ortho-phosphates or potassium salt of $P_2S_5$-terpene reaction product are preferred.

Lubricating oils for additives of this invention can be any natural or synthetic material having lubricating properties. Thus, the base may be a hydrocarbon oil of wide viscosity range, e.g. 100 SUS at 100° F. to 150 SUS at 210° F. The hydrocarbon oils may be blended synthetic lubricants such as polymerized olefins, organic esters of poly-basic organic and inorganic acids, e.g. di-2-ethylhexyl sebacate; polyalkyl silicone polymers, e.g. dimethyl silicone polymer, and the like. If desired, the synthetic lubricants may be used as the sole base lubricant.

Mineral lubricating oils which are particularly desirable for use in compositions of this invention and which have been used as a base for the compositions of this invention were obtained from West Texas Ellenburger crudes, East Texas crudes, Oklahoma crudes, California crudes. A useful refined oil therefrom had the following properties:

| | |
|---|---|
| Gravity, ° API | Min. 26.5. |
| Pour point, ° F. | Max. 10. |
| Flash, COC, ° F. | Min. 390. |
| Viscosity, SUS at 100° F. | 120–160. |
| Viscosity index | Min. 95. |

Another such oil is an SAE 30 mineral oil having the following properties:

| | |
|---|---|
| Gravity, ° API | Min. 24.5. |
| Pour point, ° F. | Max. −5. |
| Flash, COC, ° F. | Min. 415. |
| Viscosity, SUS at 210° F. | 58–63. |
| Viscosity index | 50–60. |

Preferred compositions of this invention are illustrated by the following examples:

| | Percent wt. |
|---|---|
| Composition A: | |
| Copolymer of Example A (I) | 5 |
| Salt of Example Z | 1.5 |
| Mineral lubricating oil (5W–20) | Bal. |
| Composition B: | |
| Copolymer of Example A (II) | 5 |
| Salt of Example $Z_1$ | 1.5 |
| Mineral lubricating oil (5W–20) | Bal. |
| Composition C: | |
| Copolymer of Example A (II) | 10 |
| Salt of Example $Z_1$ | 1.2 |
| Tricresyl phosphate | 0.8 |
| Sulfurized terpene (36% S) | 0.5 |
| 1,1-bis(3,5-ditert.butyl-4-hydroxyphenyl)methane | 0.75 |
| Mineral lubricating oil (SAE 5W–20) | Bal. |
| Composition D: | |
| Copolymer of Example A (II) | 5 |
| Salt of Example $Z_2$ | 1 |
| 1,1-bis(3,5-ditert.butyl-4-hydroxyphenyl)methane | 0.5 |
| Mineral lubricating oil (10W–30) | Bal. |
| Composition E: | |
| Copolymer of N-vinyl pyrrolidone and lauryl methacrylate (M.W. 450,000–600,000) B (IV) | 5 |
| Salt of Example $Z_4$ | 1.2 |
| Sulfurized polyisobutylene (20–30% S) | 0.5 |
| Mineral lubricating oil (10W) | Bal. |

Compositions A–E were tested in the Oldsmobile Scuffing Test (AMA–MS Sequence 1—Tested under conditions of report section G–IV of ASTM Committee B of Tech. D–Z, October 6, 1959, as described in report "Engine Test Sequence for Evaluating Oils for API Service"), and each composition gave excellent results passing the test four times, and reduced wear by 60–80% over base oil and the engine was clean with no signs of pitting, sludge or corrosion. When the phosphate salt was omitted from Compositions A–E, such compositions failed to pass the test. Also Compositions A–E passed the 120-hour Caterpillar L–1 engine test (250° F. oil temperature), giving engine ratings of 90–95 (100=perfect) whereas similar compositions but from which the phosphate salt and the sulfurized terpene were omitted failed the test and gave ratings of 70–75.

Compositions of the present invention can be used to effectively lubricate automotive and truck engines as well as various industrial equipment such as earth movers, tractors and mining machinery.

We claim as our invention:

A mineral lubricating oil composition consisting essentially of a major amount of mineral lubricating oil and from about 0.2% to about 10% each of (1) an oil-soluble copolymer of 2-methyl-5-vinyl pyridine/lauryl methacrylate/stearyl methacrylate, the ester mixture being in the mole ratio of 1:1 to 1:3 respectively, and the combined ester mixture to the 2-methyl-5-vinyl pyridine being in the mole ratio of 10:1 to 1:5 respectively, and having a molecular weight of from 50,000 to 700,000 and (2) an oil-soluble salt of a succinimide of mono(polyisobutylene) succinic anhydride and tetraethylene pentamine, the polyisobutylene radical having a molecular weight of about 1000 and dicresyl phosphate, the amount of dicresyl phosphate used to form the salt by reacting the two components under reflux conditions being sufficient to neutralize from 10% to 100% of the succinimide compound.

References Cited by the Examiner

UNITED STATES PATENTS

| | | | |
|---|---|---|---|
| 2,839,512 | 6/1958 | Barnum et al. | 252—51.5 |
| 3,116,248 | 12/1963 | Frew | 252—32.5 |
| 3,116,249 | 12/1963 | Ratner et al. | 252—32.5 |
| 3,185,643 | 5/1965 | Lowe et al. | 252—46.7 |
| 3,185,645 | 5/1965 | Clayton | 252—46.7 |

FOREIGN PATENTS

| | | |
|---|---|---|
| 1,265,086 | 5/1961 | France. |
| 922,831 | 4/1963 | Great Britain. |

DANIEL E. WYMAN, *Primary Examiner.*

J. R. McBRIDE, L. G. XIARHOS, *Assistant Examiners.*